UNITED STATES PATENT OFFICE.

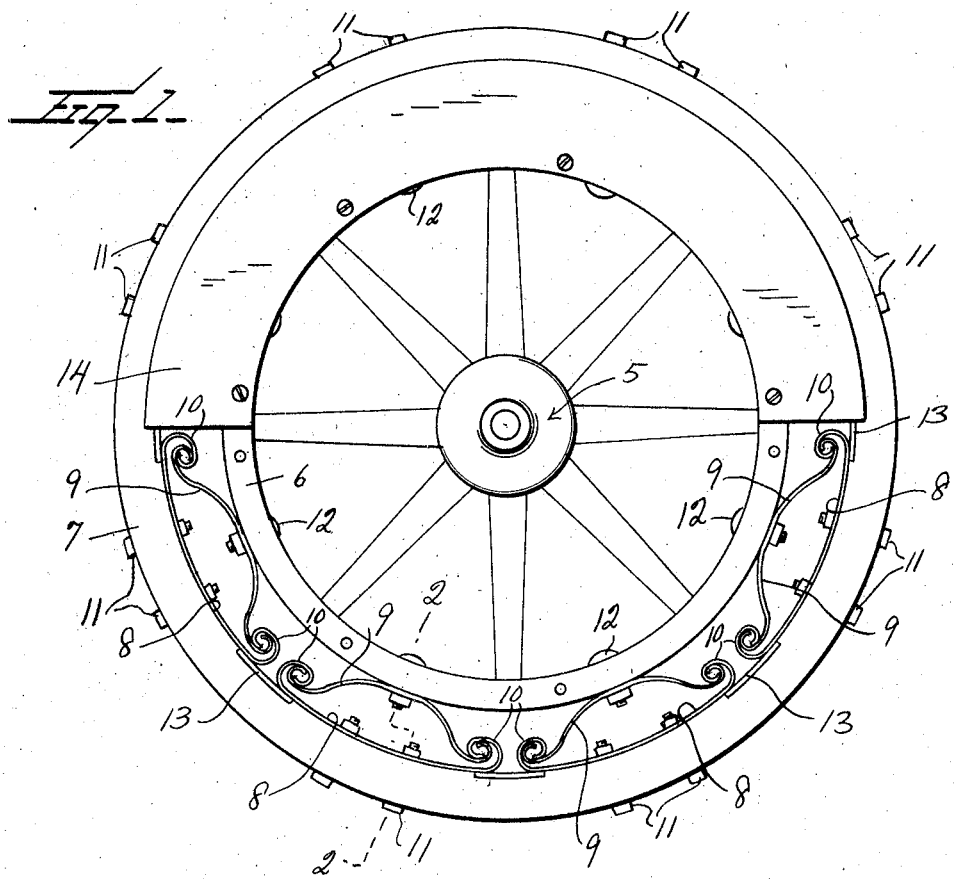

ANDREW C. HARROD, OF NEWARK, OHIO.

RESILIENT TIRE.

1,362,694. Specification of Letters Patent. Patented Dec. 21, 1920.

Application filed July 14, 1920. Serial No. 396,092.

*To all whom it may concern:*

Be it known that I, ANDREW C. HARROD, a citizen of the United States, residing at Newark, in the county of Licking and State of Ohio, have invented certain new and useful Improvements in Resilient Tires, of which the following is a specification, reference being had to the accompanying drawings.

This invention relates to resilient tires and has for its object to provide a tire capable of being incorporated in a conventional form of wheel.

Another object is to provide a tire of this character including a solid rubber tread which is held in spaced relation to the wheel by cushioning means.

Another object is to provide a tire of this character wherein the inner surface of the tread of the tire is supported at all points.

Another object of the invention is to provide a tire of this character including spring members comprising a pair of bowed springs having their ends arranged for telescopic engagement, one of said springs engaging the periphery of the wheel and the other engaging the inner surface of the tread along the entire length of said spring.

A still further object of the invention is to provide a tire of this character wherein the portion of the inner surface of the tread that is disposed between the ends of the spring members is supported by means of a plate which engages said spring members.

With the above and other objects in view, the invention consists in the improved construction and arrangement of parts to be hereinafter more particularly described, fully claimed and illustrated in the accompanying drawings, in which:—

Figure 1 is a vertical elevation of a resilient tire constructed in accordance with an embodiment of the invention, one of the plates being removed to show the mechanism of the tire, and Fig. 2 is a section taken on the line 2—2 of Fig. 1.

Referring to the drawings, 5 designates a wheel of conventional form including a felly 6. In order to properly cushion the wheel, a solid rubber tread member 7 is provided, the diameter of the solid tread being considerably greater than the diameter of the wheel so as to position the tread in annular spaced relation to the periphery of the wheel.

To properly cushion the wheel and permit the tread member 7 to flex similar to a pneumatic tire without possessing the disadvantages of a pneumatic tire, I find it of advantage to provide a plurality of spring members, each member comprising a bowed spring 8 and a bowed spring 9. The ends of the bowed spring 8 are coiled inwardly of said spring to provide tubular passages 10. This spring is intended to be secured at its intermediate portion to the inner surface of the tread member 7 by means of bolts 11. It will be noted that the convex surface of the spring 8 engages the tire along its entire length with the exception of the coiled ends. In this way, the inner surface of the tread is properly supported at all points. The bowed spring 9 has its ends coiled outwardly of said spring toward each other and adapted to be received in the passages 10 of the spring 8. In this way, the spring members may be readily assembled and disassembled and at the same time by coiling the ends of the springs 8 and 9 additional resilient force is provided. The spring 9 is secured at its intermediate portion to the periphery of the felly 6 by means of a bolt 12 which is disposed between the bolts 11. It will be noted that the spring 9 only engages the periphery of the wheel at its intermediate portion. It is not necessary for the spring 9 to engage the felly longitudinally of the length of said spring in view of the rigid nature of the felly as it is self-supported. At the same time it permits the springs to readily flex in the cushioning operation of the wheel. A plurality of these spring members are disposed between the felly and the tread closely adjacent each other. It is necessary to leave a small space between the ends of each of the spring members to provide sufficient room for the springs to expand and contract. At the same time it is necessary to support the portion of the inner surface of the solid tread bridging said space so as to hold the shape of the tread. This is accomplished by disposing a plurality of plates 13 in the inner surface of the tread 7, and in spaced relation to each other, said plates being disposed over the space between the spring members so as to bridge the same. These plates are of a length sufficient to permit the connected ends of the springs 8 and 9 of each member to slidably engage said plate. In this way, the resilient force provided by the coiled ends of the springs 8 and 9 of each member serve to properly support the plate and the portion of the tread in the vicinity of said plate.

An important feature of this device is that the bolts 11 project slightly through the tread 7 and in this way provide anti-skidding means. It is impossible for the tread member 7 to move independently of the wheel as it is connected to the wheel through the medium of the spring members.

In order to protect the springs from dirt and like foreign matter, a guard is provided for each side of the wheel, each guard comprising a pair of semi-circular plates 14 having their inner edges secured to the felly 6 and adapted to bridge the space between the felly and the tread member 7, a portion of the tread projecting beyond the outer edge of said plates. In this way the plates do not interfere with the cushioning operation of the tire.

From the foregoing it will be readily seen that this invention provides a novel form of resilient tire which contains a relatively small number of simple parts arranged in compact order and in such a manner that the entire inner surface of the tread of the tire is supported without the use of additional springs or like cushioning means. Should repairs be necessary, any one of the spring members can be readily removed by loosening the bolts 11 and 12 so as to permit the spring member, or one of the springs thereof to be easily removed. This resilient tire possesses all of the flexibility of a pneumatic tire without the disadvantages of a pneumatic tire.

What I claim is:—

1. A device of the character described comprising a wheel, a tread member disposed in spaced relation to the periphery of the wheel, springs disposed between the wheel and the tread member, each spring comprising a wheel section and a tread section, the corresponding ends of each section being curved in opposite directions and arranged for interlocking engagement, the extremity of each of said corresponding ends of the sections engaging the end of the adjacent section in diametrically spaced relation to each other.

2. A device of the character described comprising a wheel, a tread member disposed in spaced relation to the periphery of the wheel, springs disposed between the wheel and the tread member, each spring comprising a wheel section and a tread section, the tread section having its end portions curved inwardly and over the body of said section in spaced relation thereto, the extremities of the curved portions extending in the direction of the ends of the section, the wheel section having its end portions curved outwardly of said wheel section and toward each other, the extremities of the wheel section being disposed inwardly of and in spaced relation to the extremities of the tread section.

In testimony whereof I hereunto affix my signature.

ANDREW C. HARROD.